United States Patent [19]
Gibert

[11] 3,779,109
[45] Dec. 18, 1973

[54] DEVICE FOR MACHINING A WORKPIECE BY A TURNING OPERATION

[76] Inventor: Pierre Antoine Theophile Gibert, 16, rue d'Espourrins, Tarbes, France

[22] Filed: Mar. 27, 1970

[21] Appl. No.: 22,783

[30] Foreign Application Priority Data
Mar. 27, 1969 France............................69 09026

[52] U.S. Cl. .................................... 82/2.5, 82/20
[51] Int. Cl............................................ B23b 13/02
[58] Field of Search............................. 82/20, 2, 2.5

[56] References Cited
UNITED STATES PATENTS

| | | | |
|---|---|---|---|
| 2,288,578 | 6/1942 | Yeomans et al. | 82/20 |
| 3,367,220 | 2/1968 | Copeland | 82/20 X |
| 2,289,167 | 7/1942 | Bannister et al. | 82/20 X |
| 1,164,593 | 12/1915 | Bosler et al. | 82/20 |

*Primary Examiner*—Leonidas Vlachos
*Attorney*—Waters et al.

[57] ABSTRACT

A device for machining a workpiece comprises two or more jacks fastened on a plate carrying tool holders arranged around and centered on a mandrel spindle carrying the workpiece, the tool holders bearing on packing inserts interposed between adjacent tool holders and secured to the plate. The position of the tools in the tool holders is controlled by abutment of the tool holders on the packing inserts, the thickness of which determines the machined diameter of the workpiece.

8 Claims, 5 Drawing Figures

DEVICE FOR MACHINING A WORKPIECE BY A TURNING OPERATION

BRIEF SUMMARY OF THE INVENTION:

The invention relates to the machining of workpieces and particularly to the turning of cylindrical parts to a given diameter.

The attainment of a specific diameter on cylindrical parts by a turning operation requires fine control of the working position of the tools. Such control depends on the size of the blank, the depth of cut, the rate of feed and the material of the part to be turned.

Currently, some amount of trial and error is involved and several test specimens are produced for determining the correct setting of the tools in order to obtain the prescribed diameter of the turned part while compensating for the considerable distortions of the conventional tool bearings.

An object of the present invention is to remedy these deficiencies by the use of a device of novel construction which allows the required diameter to be obtained immediately on the turning of the first part by instantaneous and simultaneous adjustment of the tools independent of frame distortions.

According to the invention there is provided apparatus for machine a workpiece comprising means supporting a workpiece along a determined axis, a plurality of rotatable tools arranged at the vertices of a regular polygon having a center on said axis, means providing relative rotary movement between said tools and said workpiece, and a rigid plate extending normal to said axis and supporting said tools.

Figure 1:
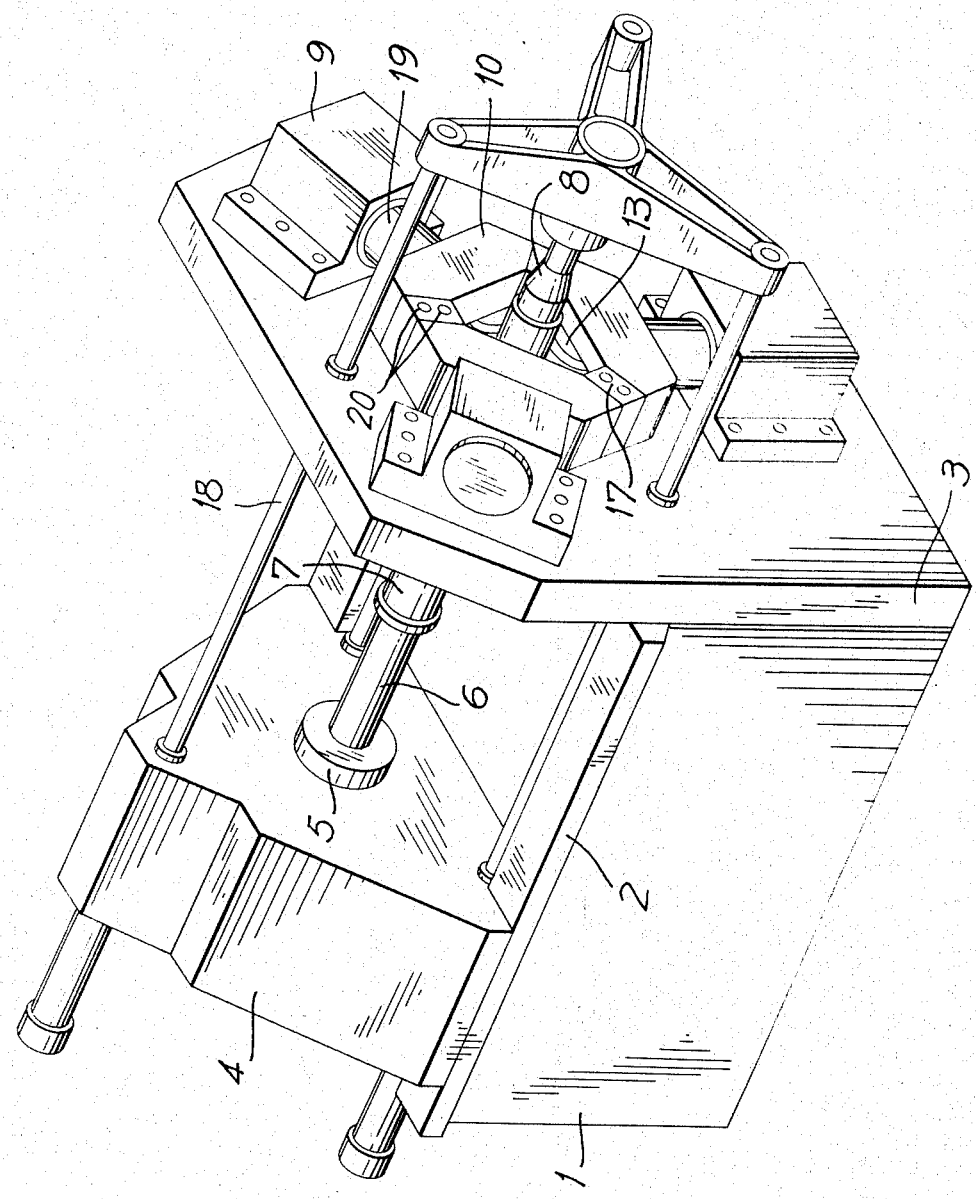
FIG. 1 is a perspective view of the machine according to the invention.
Figure 2:
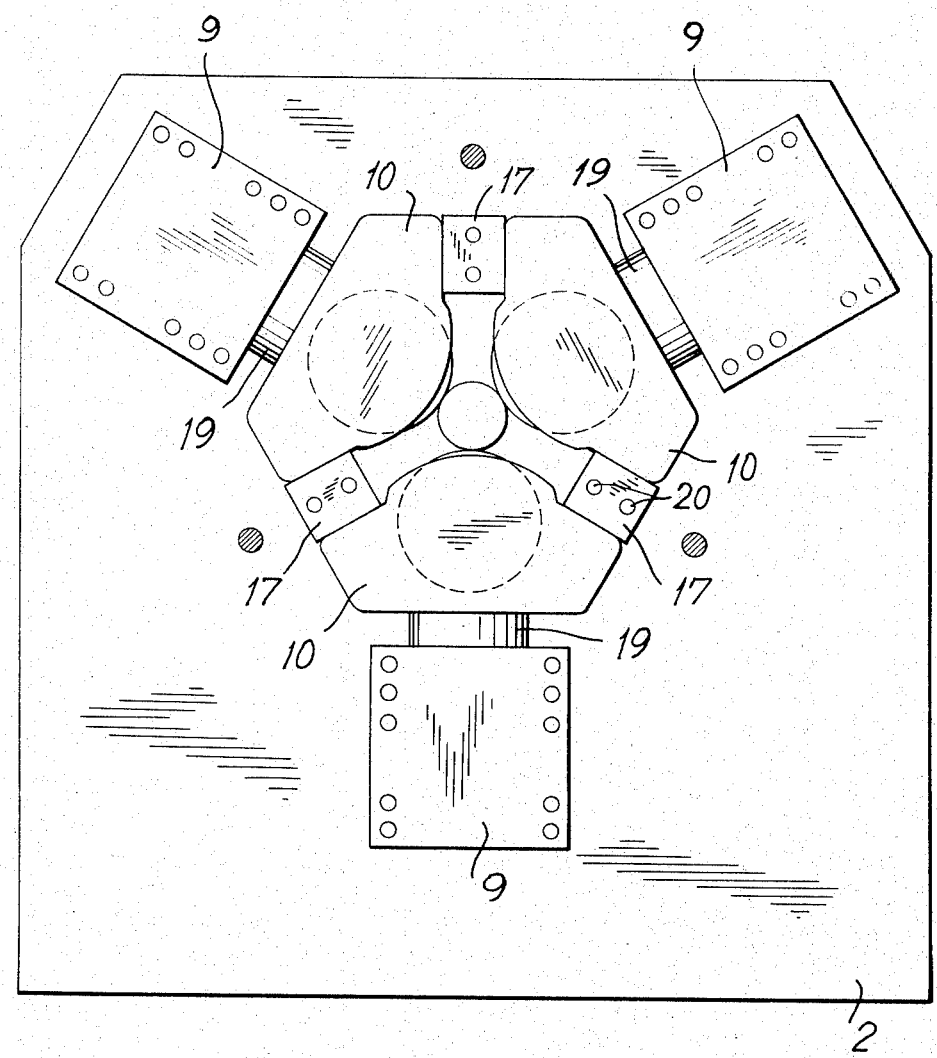
FIG. 2 is a front elevation view of the machine.

DETAILED DESCRIPTION:

The machine comprises a frame 1 which carries two horizontal prismatic guideways 2 and an extremely rigid plate 3 firmly fastened at one of the ends of the frame. A headstock 4 is mounted on the guideways 2 for travel towards and away from plate 3. A spindle 5 is mounted in the headstock and carries a cylindrical mandrel 6 on which is mounted a workpiece 7 which is driven in rotation during the turning operation. The workpiece is held firmly against the end of mandrel 6 by means of a tail spindle 8 coupled to headstock 4 by three stay rods 18 passing through plate 3.

A circular hole is bored through the plate 3 coaxial with the axis of the spindle 5, and the plate 3 carries an assembly on its outside face which constitutes the object of this invention.

Figure 3:
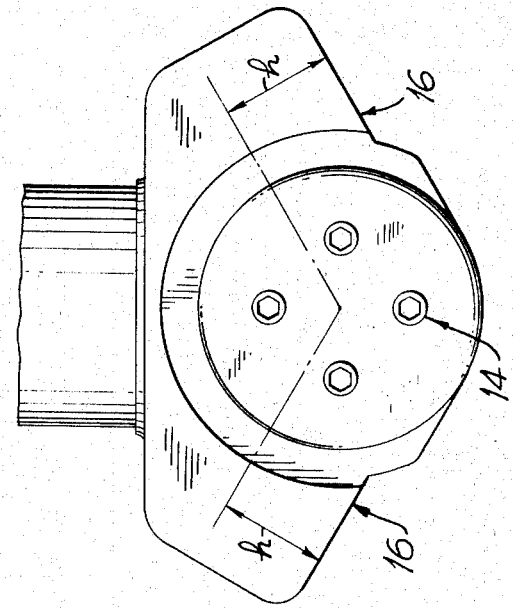
FIG. 3 is a front elevation view of a tool holder of the machine.
Figure 4:
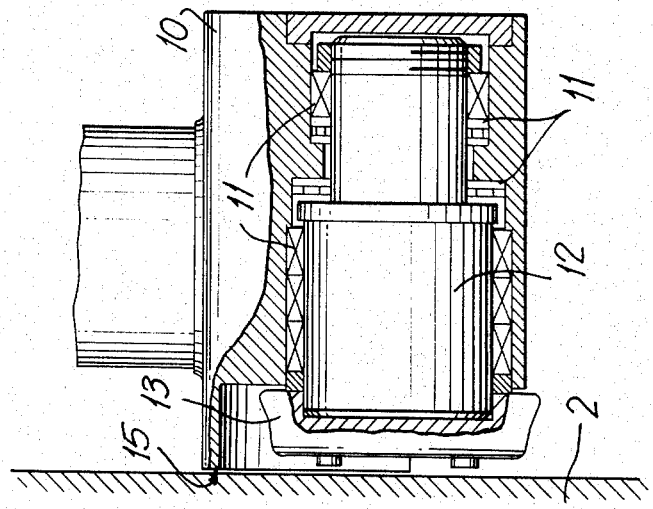
FIG. 4 is a longitudinal sectional view through the tool holder of FIG. 3.

The assembly comprises three identical sub-assemblies arranged at equal angular intervals of 120° around the spindle center. Each sub-assembly comprises a double-acting hydraulic jack 9, capable of developing a thrust of the order of 40 metric tons, anchored and fastened onto plate 3. The jack 9 has a rod 19 which carries a specially shaped head forming a tool holder 10. The tool holder 10 as shown in FIGS. 3 and 4, is constituted as a housing with a plurality of concentric bores extending perpendicularly to the axis of the rod 19. The concentric bores accommodate a fulcrum pin 12 of the tool, and roller and thrust bearings 11 for the pin. A tool 13 is mounted on each fulcrum pin 12 and centered by a cylindrical coupling fastened by screws 14. Each tool is inset slightly with respect to face 15 of tool holder 10 as shown in FIG. 4.

As the jack 9 is positioned and fastened on plate 3, face 15 of the tool holder has to be able to slide with respect to plate 3 with minimum play so as to prevent swiveling of the tool holder around the axis of the jack rod.

The tool holder 10 as seen from the front in FIG. 3 comprises two lateral symmetrical faces 16 inclined at 60° with respect to the axis of the jack rod 19 and located at the same distance h from the center of the tool The simultaneous positioning of the three tools for a machining operation on the workpiece is obtained by engaging the faces 16 of the tool holders against three inserts 17 which are all of absolutely equal thickness. The axis of symmetry of each of these inserts is located by means of lugs 20 engaged in a housing of plate 3, the axis of symmetry of each insert lying precisely along the bisector of the angle formed by the axes of two adjacent jacks.

To effect a turning operation, the jacks 9 are fed by fluid under pressure. The tool holders are displaced toward the mandrel center and simultaneously position themselves by abutting against inserts 17. Workpiece 7 is driven in rotation by spindle 5 and is transported by headstock 4 to pass between the three tools 13 which effect a turning operation. Each tool is subject to the stresses of the turning operation which produces radial and tangential forces on the tools. The tangential forces cause the tools to rotate around pins 12 and the radial forces urge the tools outwardly against the jack thrust. The thrust must clearly be greater than the radial force, so that the tool holders remain in contact with the inserts 17 and the resultant thrust of each of the three jacks balance among themselves and stress the inserts 17 in compression and the plate 3 in tension, which at the level of the tools produces a practically negligible distrtion. This is one of the particular advantageous features of this invention. The axial reaction is resisted by pins 12, thrust bearings 11, tool holders 10 and jack rods 9.

In this turning operation in the device according to this invention, each tool preserves its original position. That position defines a turning diameter for the workpiece which is reproduced exactly and accurately on the machined part. The diameter $d$ of the turned part is wholly determined by geometrical factors, namely: the tool diameter $D$, the distance $h$ of the faces 16 from the axis of pins 12, and the thickness $e$ of the inserts 17.

Figure 5:
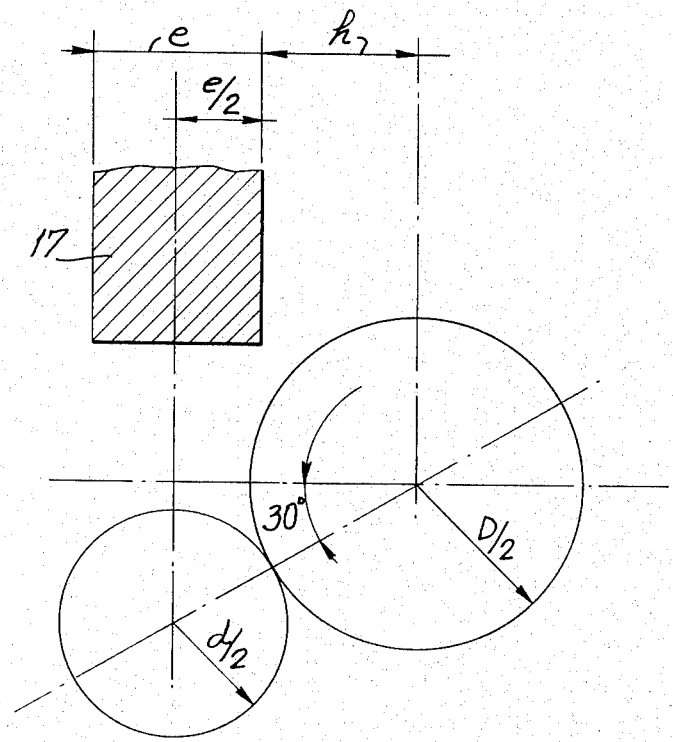
FIG. 5 is a diagrammatical illustration indicating the geometrical relation between the part to be machined and several components of the machine.

Considering the diagrammatic representation in FIG. 5, the following formula is obtainable;

$$d = (1/\cos 30°)(e + 2h) - D$$

The distance $h$, diameter $D$ and the angle are constants, and thus the diameter $d$ is simply a function of the thickness $e$.

Thus according to this invention, for each diameter of machined workpiece there is an easily computable and corresponding thickness for the inserts 17.

A change from one diameter to another therefore requires only the replacement of the set of inserts 17 by another of suitable thickness. Accordingly, the inserts 17 are supported from the plate 3 by suitable fasteners enabling replacement of the inserts with others of different thickness.

It should be noted that the range of diameters producible with such a device is defined by the two extreme positions of the three tools, namely:

a. close together toward the center of the mandrel, to which the approach is limited when the tools become mutually tangential; this position defines the smallest diameter attainable, b. spread apart to the fullest extent of the stroke allowed by jacks 9 in order to obtain the largest diameter.

Also, these jacks can be placed in various positions equidistant from the mandrel axis, within the limits of the machine's possibilities.

Of course, various modifications can be made to the device just described, without exceeding the scope of the invention. In particular, this device can be mounted on a sliding carriage. Also, any means of exerting thrust by a nonhydraulic means can be employed. Control of the turning diameter can likewise be effected by stacking the inserts or using shims. It is also possible to apply this invention to the case of turning with two tools only.

What is claimed is:

1. Apparatus for machining a workpiece comprising means supporting a workpiece along a determined axis, a plurality of rotatable tools arranged at the vertices of a regular polygon having a center on said axis, means providing relative rotary movement between said tools and said workpiece, a rigid plate extending normal to said axis and supporting said tools, means for feeding said workpiece along said axis towards said plate and the tools supported thereby, a tool holder for each said tool, jack means acting on said tool holders to urge the tools to said positions at the vertices of the polygon, and means engaging said tool holders to locate and position the same such that the tools are at the vertices of said polygon, the latter said means comprising insert pieces secured to said plate and interposed between adjacent tools holders for abutment thereby.

2. Apparatus as claimed in claim 1 wherein said plate has an opening which is coaxial with said axis for the passage of said workpiece.

3. Apparatus as claimed in claim 1 wherein each said insert piece has opposite parallel faces for abutment of adjacent tool holders, said insert pieces having a thickness as measured between said faces, all the insert pieces being of identical thickness.

4. Apparatus as claimed in claim 3 wherein the thickness of the insert pieces determines the position of the tools and the degree of machining of the workpiece, said apparatus further comprising means replaceably supporting the insert pieces on the rigid plate to enable replacement of insert pieces of different thicknesses for different degrees of machining.

5. Apparatus as claimed in claim 3 wherein said tool holders have lateral planar surfaces for abutment on the faces of adjacent inert pieces, said lateral planar surfaces being symmetrical with respect to an axis passing through the center of the tool and said axis along which the workpiece is supported.

6. Apparatus as claimed in claim 5 wherein said jack means acts radially on each said tool holder along the axis passing through the center of the tool in such holder.

7. Apparatus as claimed in claim 6 wherein said tool is circular and said workpiece is machined to cylindrical configuration.

8. Apparatus as claimed in claim 7 wherein said means providing relative angular movement between the tools and workpiece comprises means for rotating said workpiece along the axis of support thereof.

* * * * *